(12) United States Patent
Gibbons et al.

(10) Patent No.: US 6,421,212 B1
(45) Date of Patent: Jul. 16, 2002

(54) THIN FILM READ HEAD STRUCTURE WITH IMPROVED BIAS MAGNET-TO-MAGNETORESISTIVE ELEMENT INTERFACE AND METHOD OF FABRICATION

(75) Inventors: Matthew Gibbons; Kenneth E. Knapp, both of Livermore; Ronald A. Barr, Mountain View; Benjamin P. Law, Fremont; James Spallas, Dublin; Ming Zhao, Fremont, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/400,205

(22) Filed: Sep. 21, 1999

(51) Int. Cl.[7] .................................................. G11B 5/39
(52) U.S. Cl. .............................. 360/327.31; 360/324.12
(58) Field of Search ........................ 360/327.3, 327.31, 360/327.32, 324.12, 324.2, 326

(56) References Cited

U.S. PATENT DOCUMENTS

| | | | |
|---|---|---|---|
| 5,640,343 A | | 6/1997 | Gallagher et al. |
| 5,712,612 A | * | 1/1998 | Lee et al. .................... 324/252 |
| 5,729,410 A | * | 3/1998 | Fontana, Jr. et al. ........ 360/113 |
| 5,792,510 A | | 8/1998 | Farraow et al. |
| 5,793,697 A | | 8/1998 | Scheuerlein |
| 5,828,531 A | * | 10/1998 | Gill ............................ 360/113 |
| 5,898,547 A | * | 4/1999 | Fontana, Jr. et al. ........ 360/113 |
| 5,898,548 A | * | 4/1999 | Dill et al. ................... 360/113 |
| 5,901,018 A | * | 5/1999 | Fontana, Jr. et al. ........ 360/104 |
| 5,966,012 A | * | 10/1999 | Parkin ......................... 324/252 |
| 6,005,753 A | * | 12/1999 | Fontana, Jr. et al. ........ 360/113 |
| 6,061,211 A | * | 5/2000 | Yoda et al. .................. 360/113 |
| 6,094,328 A | * | 7/2000 | Saito ....................... 360/324.12 |
| 6,198,608 B1 | * | 3/2001 | Hong et al. .................. 360/320 |

FOREIGN PATENT DOCUMENTS

JP          07210832 A   *   8/1995   ............ G11B/5/39

OTHER PUBLICATIONS

"Tunneling Magnetoresistance (TMR)" (http://www.city-.ac.uk/mathematics/NanoStructures/tmr.html).*
"Giant Magnetoresistance" (http://www.stoner.leeds.ac.uk/research/gmr.htm).*

* cited by examiner

Primary Examiner—William Klimowicz
(74) Attorney, Agent, or Firm—Carr & Ferrell LLP

(57) ABSTRACT

The present invention provides an improved bias magnet-to-magnetoresistive element interface and method of fabrication. In a preferred embodiment, the wall/walls of an MR element opposing a bias layer are formed by over etching to provide vertical side walls without taper. In the preferred embodiment, a protective element is formed over the MR element to protect it during etch processes. In some embodiments, a filler layer is deposited prior to bias layer formation. In CIP embodiments, any portion of the filler layer forming on vertical side walls of the MR element is etched to provide an exposed side wall surface for contiguous bias layer formation. In CPP embodiments, the filler layer forms on a vertical back wall and electrically insulates the MR element from the bias layer. In CIP and CPP embodiments, tapered portions of the bias material, which form overhanging the MR element, are removed by directional etching to improve the direction and stability of the induced longitudinal field within the MR element. In some CIP embodiments, tapered overhang removal allows for formation of improved lead structures, which may be deposited on the MR element closer to the side walls, and which are not pinched off by the overhang of an underlying bias layer, thus improving current density profile and definition of the actual effective track width of the device.

7 Claims, 6 Drawing Sheets

THIN FILM READ HEAD STRUCTURE WITH IMPROVED BIAS MAGNET-TO-MAGNETORESISTIVE ELEMENT INTERFACE AND METHOD OF FABRICATION

This invention was made with Government support under a Cooperative Agreement (CRADA TC-840-94) and the Managing and Operating Contract (W-7405-ENG-48) with the Regents of the University of California. The Government has certain rights in this invention.

BACKGROUND OF THE INVENTION

Data is stored on magnetic media by writing on the magnetic media using a write head. Magnetic media may be formed in any number of ways, such as tape, floppy diskette, hard disk, or the like. Writing involves storing a data bit by utilizing magnetic flux to set the magnetic moment of a particular area on the magnetic media. The state of the magnetic moment is later read, using a read head, to retrieve the stored information.

Conventional thin film read heads employ magnetoresistive material, generally formed in a layered structure of magnetoresistive and non-magnetoresistive materials, to detect the magnetic moment of the bit on the media. A sensing current is passed through the magnetoresistive material to detect changes in the resistance of the material induced by the bits as the media is moved with respect to the read head.

Magnetoresistive read heads use permanent magnet layers for stabilizing the response of the device as well as setting the quiescent state of the device. In current-in-the plane or CIP devices, such as anisotropic magnetoresistive and spin valve devices, the permanent magnet is formed contiguous with a magnetoresistive element and is used to set the magnetization of the magnetoresistive element in a longitudinal direction by pinning the magnetization at each end of the magnetoresistive element stripe. This prevents formation of closure domains at the ends of the element. Without pinning, movement of the end domains can cause hysteresis in the magnetoresistive response of the device.

A conventional method for making the permanent magnet layer in an anisotropic magnetoresistive and spin valve read sensors involves the formation of a contiguous junction as the result of a lift-off process, for example, as disclosed in U.S. Pat. No. 5,079,035, by Krounbi et al., issued Jan. 7, 1992, entitled METHOD OF MAKING A MAGNETORESISTIVE READ TRANSDUCER HAVING HARD MAGNETIC BIAS, and in U.S. Pat. No. 5,664,316, by Chen et al., issued Sep. 9, 1997, entitled METHOD OF MANUFACTURING MAGNETIRESISTIVE READ TRANSDUCER HAVING A CONTIGUOUS LONGITUDINAL BIAS LAYER, both herein incorporated by reference in their entireties.

In such a process, layers of the magnetoresistive material are deposited on a substrate. A reentrant bi-layer resist, consisting of a thin underlayer and a thick imaging layer, is formed on the magnetoresistive material. An exposure and a develop step define the edge of the resist and unmasks regions of the magnetoresistive layers. Use of an appropriate developer dissolves the underlayer forming an undercut. The size of the undercut is determined by the develop time.

The magnetoresistive material is ion beam etched, to form the magnetoresistive element. Layers are deposited adjacent the magnetoresistive element to form the contiguous junction. Typically, these adjacent layers can consist of an underlayer, such as Cr, a permanent magnet material, such as CoCrPt, and a lead layer, such as Au. The permanent magnet and leads taper as they approach the contiguous junction and may overhang the top of the magnetoresistive device as illustrated in the patents referenced above.

The present inventors have noted several problems with such a configuration. The extremely thin lead material on top of the magnetoresistive element does not provide a low resistance current path. The actual current density profile could be quite complex, leading to ambiguity in the actual effective track width of the magnetoresistive element.

In addition, the combined effects of the taper and the overhang can cause a decrease, of the permanent magnet induced longitudinal field, from the center to the edge of the magnetoresistive device. This will cause the formation of domain walls which affect the stability of the device. Even where the magnet does not overlay the magnetoresistive material, the tapered end of the permanent magnet decreases the thickness of the remnant magnetization Mr of the magnet near the edge of the magnetoresistive device, thus reducing the stabilizing effect of the magnet.

In a current perpendicular-to-the plane or CPP device such as a multilayer giant magnetoresistive device, the quiescent state of the device has antiparallel magnetic alignment of the magnetoresistive element layers for maximum resistance. A bias permanent magnet is used to shift the relative magnetization angle between layers 45 degrees so that the device operates in the middle of the linear region. The magnet is placed on the side of the stack, away from the air bearing surface at a separation which achieves the proper biasing, as disclosed in U.S. Pat. No. 5,784,224, by Rottmayer and Zhu, issued Jul. 21, 1998, herein incorporated by reference in its entirety.

In the current perpendicular-to-the plane multilayer device, a tapered magnet overlaying the magnetoresistive material is unacceptable. The magnet and the magnetoresistive material must be insulated from each other. Also, the magnetoresistive material and the magnet must be separated so that the biasing field is relatively uniform along the height of the magnetoresistive material and so that the side of the magnetoresistive element nearest the permanent magnet is not pinned. The field must be uniform since the field from the permanent magnet is the only means to properly bias the device. These requirements place even more stringent limits on the configuration of the permanent magnet than with contiguous junction CIP devices. As such, preventing permanent magnet taper and overhang in CPP devices is even more critical to optimizing performance of the device.

BRIEF SUMMARY OF THE INVENTION

The preferred method and structure of the present invention allows for an improved bias magnet-to-magnetoresistive element interface to improve the longitudinal bias of a magnetoresistive element.

In a contiguous junction embodiment of the present invention, the magnetoresistive element has vertical side walls formed by over etching to remove side wall taper. When forming the side walls, a portion of the underlying layer is etched forming a cavity in the underlying layer. A magnetic bias material layer may be deposited so that it abuts the side wall to form a contiguous junction with the magnetoresistive element. It is preferred to form the magnetic bias layer so that its top and bottom surfaces are generally aligned, or spaced further apart so that the magnetoresistive element is aligned within the bias layer. Such a junction improves the domain structure within the magnetoresistive element, particularly near the edge of the magnetoresistive element.

In a typical embodiment, a reentrant resist structure, such as a bilayer resist structure is used to pattern deposition of the magnetic bias material. In such a case, portions of the bias material may form under the overhang of the resist structure to form tapered portions overhanging the magnetoresistive element. In such embodiments, the overhanging taper portion/portions may be removed using directional etching.

Also with this embodiment, a protective element is formed on, or over, the magnetoresistive element prior to bias material deposition to protect the element during etch processes. In the preferred embodiments, the protective element is formed from a layer of protective material, such as inorganic insulation material, along with formation of the magnetoresistive element.

It is possible with such embodiments, to deposit a filler layer in the cavity prior to bias layer formation. In such a case, any portion forming on the side walls of the magnetoresistive element may be etched using directional etching techniques known in the art to allow contiguous joining of the magnetoresistive element and the bias layer. Also with this embodiment, the protective element is employed to protect the magnetoresistive element during etching of the side wall filler layer material.

In CPP embodiments of the present invention, the magnetoresistive element is formed with a vertical back wall displaced from an air bearing surface. The back wall is formed by over etching to remove back wall taper as in the contiguous junction embodiments.

In CPP embodiments, however, the filler layer is deposited on the back wall prior to bias layer formation to insulate the magnetoresistive element from the bias layer. As with the contiguous junction embodiments, a taper portion of the bias layer may form under the overhang of the resist structure and overhang the magnetoresistive element. The overhanging taper portion may be removed using a directional etching.

As with contiguous junction embodiments, it is preferred to form the magnetic bias layer so that its top and bottom surfaces are at least generally aligned, or spaced further apart so that the magnetoresistive element is aligned within the bias layer. Also, as with the contiguous junction embodiments, it is preferred that bias layer have a generally parallel wall opposing the back wall of the magnetoresistive element, albeit insulated from the back wall.

Also with this embodiment, a protective element is formed, as in the contiguous junction embodiments, on, or over, the magnetoresistive element to protect the element during etching of the overhanging taper portion.

Removing side or back wall taper and the overhanging taper portions/portion improves the direction and stability of the induced longitudinal field within the magnetoresistive element.

In addition, in some contiguous junction embodiments, tapered overhang removal allows for the formation of improved lead structures. As the bias layer does not overhang the magnetoresistive element, lead material may be deposited on the top surface of the magnetoresistive element closer to side walls. In addition, the leads are not pinched off by the overhanging taper portion of the underlying bias layer. As such, the magnetoresistive element-to-lead interface of these embodiments improves current density profile and improves definition of the actual effective track width of the device.

DETAILED DESCRIPTION OF THE PREFERRED EMBODIMENTS OF THE INVENTION

Figure 1A:
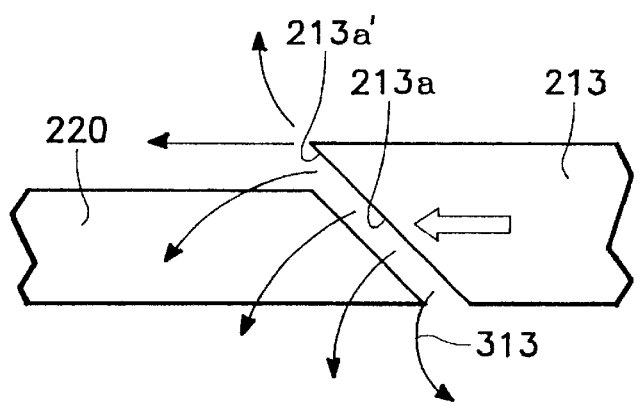
FIG. 1A is a conceptualized drawing of a conventional bias magnet as noted by the present inventors.
Figure 1B:
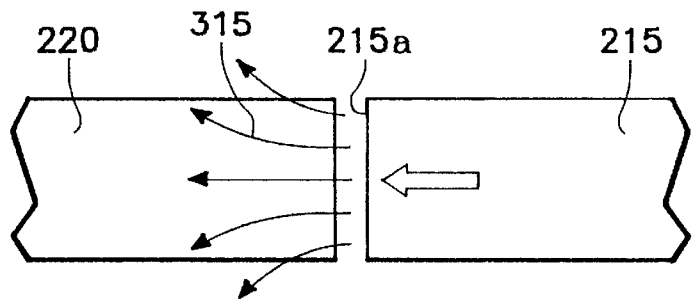
FIG. 1B is a conceptualized drawing showing the effect of an improved bias magnet profile in accordance with the preferred embodiment of the present invention.

Improved Bias Magnet Configuration (FIGS. 1A & 1B)

The preferred method and structure of the present invention allows for an improved bias magnet-to-magnetoresistive element interface to improve domain stabilization in magnetoresistive read elements. The effects of the improved bias magnet-to-magnetoresistive element interface of the preferred embodiment of the present invention, as noted by the present inventors, is depicted with reference to FIGS. 1A & 1B.

FIG. 1A illustrates the magnetic field lines 313 of a conventional bias magnet 213 having a tapered sidewall 213a opposing magnetoresistive element 220. Also, as depicted in FIG. 1A, the conventional bias magnet 213 may have a portion 213a'overhanging the magnetoresistive element 220. Such structures and configuration can separately, and in conjunction, cause the magnetic field lines 313 to be distributed through a magnetoresistive element 220 as shown in FIG. 1A.

FIG. 1B illustrates the magnetic field lines 315 of a bias magnet 215 with a non-tapered generally planar sidewall 215a opposing magnetoresistive element 220. The magnetic field lines 315 are generally parallel with the plane of the magnetoresistive element 220, thus increasing the magnitude of the in plane field component near the edge of the magnetoresistive element 220 and improving the stabilizing effect of the bias magnet near the edge of the magnetoresistive element 220.

Embodiments of the present invention may have a contiguous bias magnet-to-magnetoresistive element junction, such as in CIP devices, or, may have non-contiguous bias magnet-to-magneto-resistive element junction, such as in CPP devices.

Current-in-the Plane Embodiments (FIGS. 2–9)

FIGS. 2–9 show a cross-sectional view of a partially fabricated CIP embodiment where the plane of the cross-section is parallel to the ABS or air bearing surface.

Figure 2:
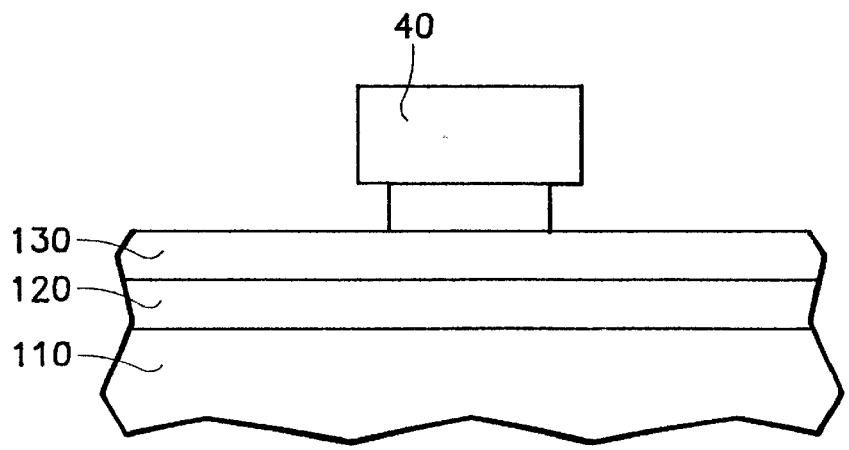
FIG. 2 shows a partially fabricated CIP thin film read head in accordance with a preferred embodiment of the present invention.
Figure 3:
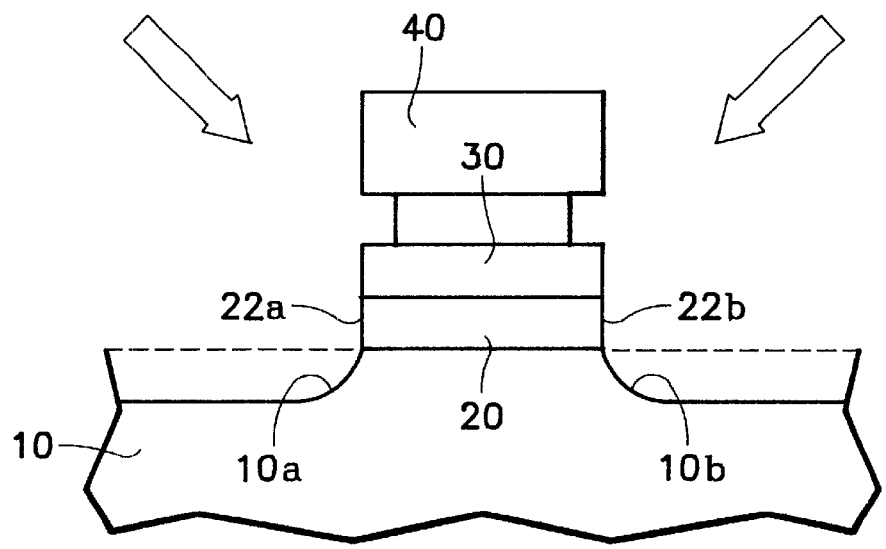
FIG. 3 shows a partially fabricated CIP thin film read head in accordance with a preferred embodiment of the present invention.

Turning to FIGS. 2 & 3, in the preferred method, a layer 120 of magnetoresistive material is deposited on a base material 110. In a preferred embodiment, the base material 110 is an insulator material, which is formed over the wafer. In the preferred embodiment, insulative base material is formed on a soft ferromagnetic shield, such as NiFe, which in turn is formed on the wafer substrate. In different CIP embodiments of the present invention, the base material 110 may be a substrate such as silicon or other type wafer, or it may be an insulation layer formed on, or over, other layers or devices. The magnetoresistive material layer 120 may have a single layer, or multiple layers, from which a magnetoresistive element will be formed. The preferred embodiments of the present invention have any known sensor type, such as anisotropic magnetoresistive, spin valve, or any other known type.

A protective layer 130 is deposited on, as shown in FIG. 3, or over, the magnetoresistive layer 120. The protective layer 130 is used to protect the underlying surface during formation of permanent magnet and other insulation structures, as will be discussed further below. It is presently preferred to form the protective layer 130 of any typical inorganic insulative material, such as for example $Al_2O_3$, $SiO_2$, $SiN_x$, or the like.

An overhanging or reentrant photoresist structure 40, is formed on the protective layer 130 and is used to pattern a magnetoresistive element 20 from magnetoresistive layer 120. The reentrant resist structure 40 may be a bilayer resist structure as shown in FIG. 2, or may be fabricated from a single layer, negative resist, trilayer resist, silated, or others as known in the art. In the preferred embodiment of the present invention, the magnetoresistive element 20 is formed by etching through the protective layer 130, through the magnetoresistive layer 120, and into the underlying base material 110. In some embodiments, it is preferred that the base material not be etched completely through so as to ensure adequate insulative base material to prevent shorting between layers separated by the insulative base material, such as shield and bias magnet material.

By etching past the magnetoresistive layer 120 and into the layer 110 below the magnetoresistive layer 120, the magnetoresistive element 20 may be formed with generally vertical sidewalls 22a & 22b. Sidewall tapering, rather than occurring in the magnetoresistive element sidewalls 22a & 22b, instead occurs in the underlying etched base material 10, shown in FIG. 3 as 10a & 10b. As such, etching into the underlying base material layer forms the magnetoresistive element with generally planar sidewalls 22a & 22b, and, preferred embodiments, forms a cavity in the underlying base material 10.

Providing a magnetoresistive element 20 without tapered sidewalls allows for improved bias magnet profile with respect to the magnetoresistive element 20. It allows the bias magnet to be formed with generally vertical sidewalls 22a & 22b opposing the magnetoresistive element sidewalls. This improves the domain structure within the magnetoresistive element 20, particularly near the edge of the magnetoresistive element 20.

Figure 4:
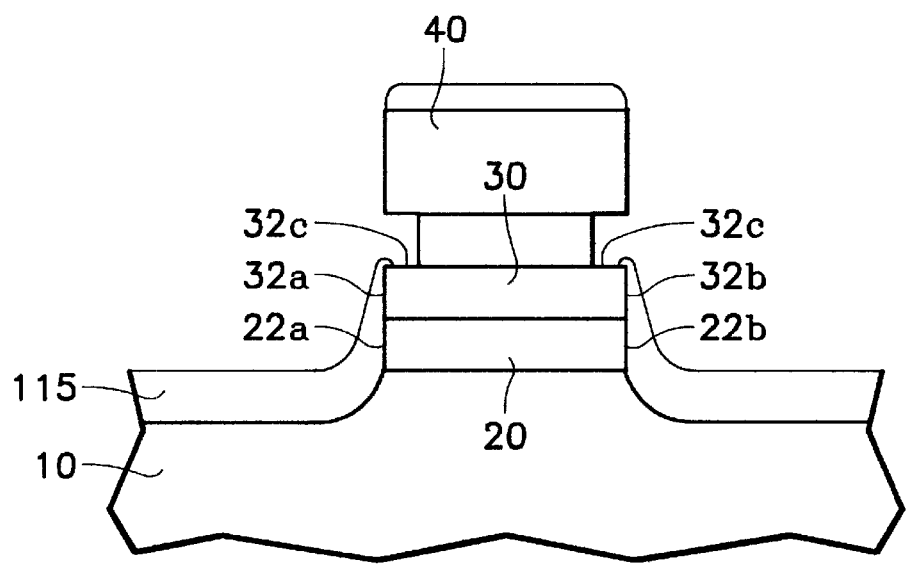
FIG. 4 shows a partially fabricated CIP thin film read head in accordance with a preferred embodiment of the present invention.

Turning to FIG. 4, in some embodiments, a fill layer 115 is deposited within the cavity formed in the base material 10. The fill layer 115 may be formed of an insulation material, such as for example $Al_2O_3$, $SiO_2$, $SiN_x$, or the like. A portion of the fill layer 115 also deposits on the sidewalls 22a & 22b of the magnetoresistive 20 and on the sidewalls 32a & 32b of protective element 30. A portion of the fill layer also may form on the top surface 32c of the protective element 30 under the overhang of bilayer resist structure 40.

The amount of the fill layer 115 deposited is dependent upon the amount of base material 110 removed during the formation of the magnetoresistive element 10. Sputtering, physical vapor deposition or PVD, chemical vapor deposition or CVD, or ion beam deposition may be used to deposit the fill layer 115. The selection of the process will depend the cavity depth and on the desired ratio of sidewall to vertical deposition. In some embodiments, it is possible to omit the fill layer 115 as discussed below.

Figure 5:
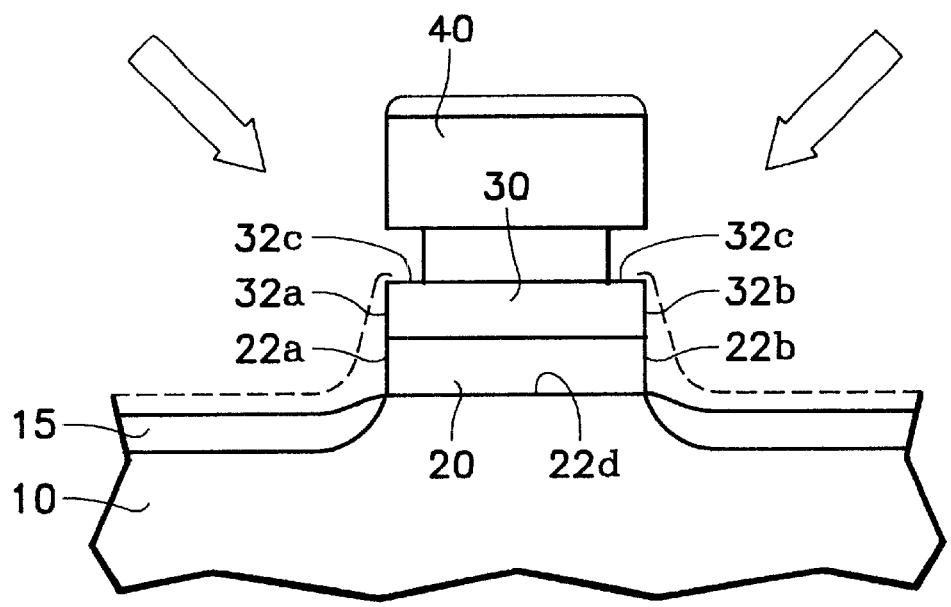
FIG. 5 shows a partially fabricated CIP thin film read head in accordance with a preferred embodiment of the present invention.
Figure 6:
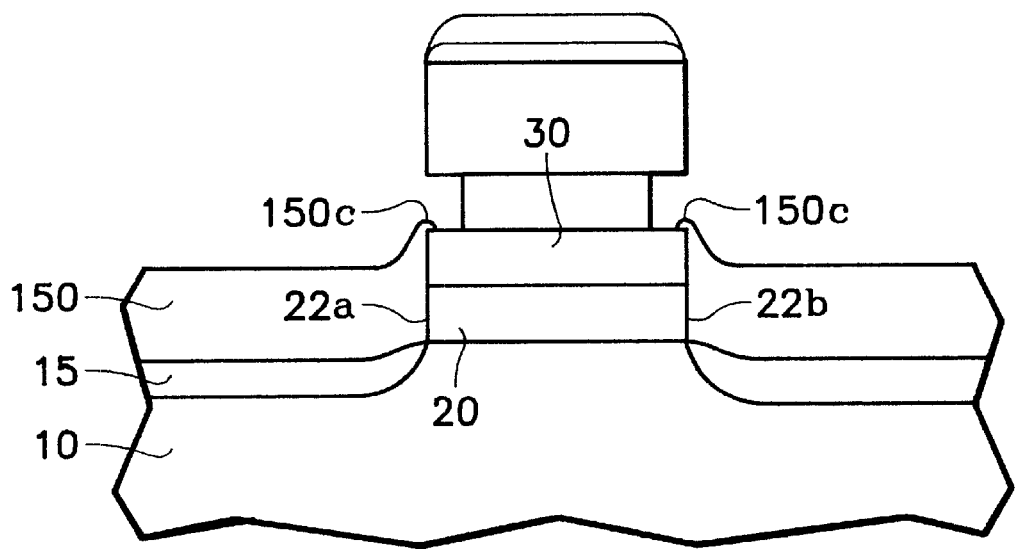
FIG. 6 shows a partially fabricated CIP thin film read head in accordance with a preferred embodiment of the present invention.

In CIP embodiments, the portion of the fill layer 115 which forms on the sidewalls 22a & 22b of the magnetoresistive element 20 is removed by directional etching, such as by ion milling, to expose the sidewalls 22a & 22b as shown in FIG. 5. With the preferred method, a portion of the fill layer 115 which forms on the top surface 32c of the protective layer also may be removed during the directional etch process. In the embodiment of FIG. 5, deposition and etching of the fill layer 115 should leave a remaining portion 15 of the fill layer approximately level with, or preferably somewhat below, the level of the bottom 22d of the magnetoresistive element 20. This allows a bias layer 150 to be deposited so that it abuts the magnetoresistive element 20, forming a contiguous junction with the sidewalls 22a & 22b as shown in FIG. 6.

Figure 7:
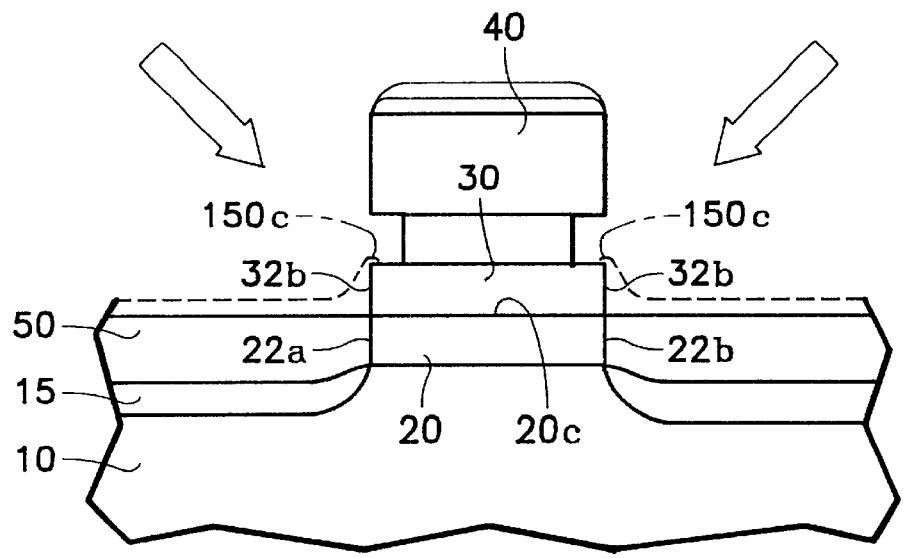
FIG. 7 shows a partially fabricated CIP thin film read head in accordance with a preferred embodiment of the present invention.

The bias layer 150 may be formed of a magnetic material capable of controlling the magnetic orientation and the domain states of the magnetoresistive element 20. Although any know biasing materials and methods may be used, in the preferred embodiment, a permanent magnet type material, such as CoCrPt, CoPt, CoCr, or other known permanent magnet is used to bias the magnetoresistive element 20. The use of an underlayer such as Cr and overlayer such as Ta is usually desirable. The bias layer 150 may deposit with overhanging tapered portions 150c as shown in FIG. 6. The overhanging taper portions 150c may be removed by directional etching of the bias layer 150 as depicted in FIG. 7. The bias layer 50 is formed with a generally planar top surface, preferably at about the same level, or slightly above, the top surface 20c of the magnetoresistive element 20. The protective element 30 protects the top 20c of the magnetoresistive element 20 during removal of the overhanging portions 150c, as well as during etching of filler layer 50.

With the preferred method, the bias material 150 is etched so that the sidewall etch rate is maximized. The etching tilt angle and the rotational angle are adjusted to provide the desired results. Furthermore, in addition to static etching, continuous rotation etching, a combination of static and continuous rotation etching, or etching between a range of rotational angles may be employed to maximize removal of the taper portion 150c and its overhang. For example, a static etch process with tilt angles with respect to wafer normally ranging from 0–70 degrees, a rocking etch process with a rocking angle of 0 degrees static to +/−45 degrees about the axis normal to the wafer plane without substrate rotation, or continuous rotation using conventional substrate rotation with etch angles of 0–70 degrees with respect to wafer normal may be employed.

In some embodiments, leads (not shown) may be formed on the bias layer 50 prior to resist structure 40 lift-off. In such embodiments, bias layer 50 may electrically couple the leads to the magnetoresistive element 20.

Figure 8:
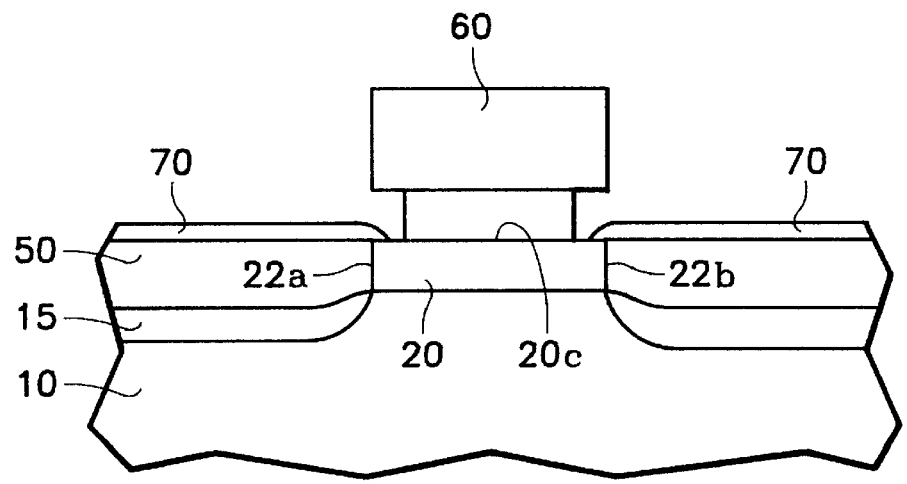
FIG. 8 shows a partially fabricated CIP thin film read head in accordance with a preferred embodiment of the present invention.

In other embodiments it may be desirable to remove the protective element 30, along with the overlying resist structure 40, prior to lead 70 formation as shown in FIG. 8. In such a case, resist structure 60 is formed on the magnetoresistive element 20 and the lead material extends onto the top surface 20c of the magnetoresistive element 20. Because the bias layer 50 does not overhang the magnetoresistive element 20, the lead material may be deposited on the top surface 20c closer to sidewalls 20a & 20b. In addition, the leads are not pinched off by the overhang of the underlying bias layer 50. This improves the magnetoresistive element-to-lead interface, improving current density profile and improving definition of the actual effective track width of the device.

Figure 9:
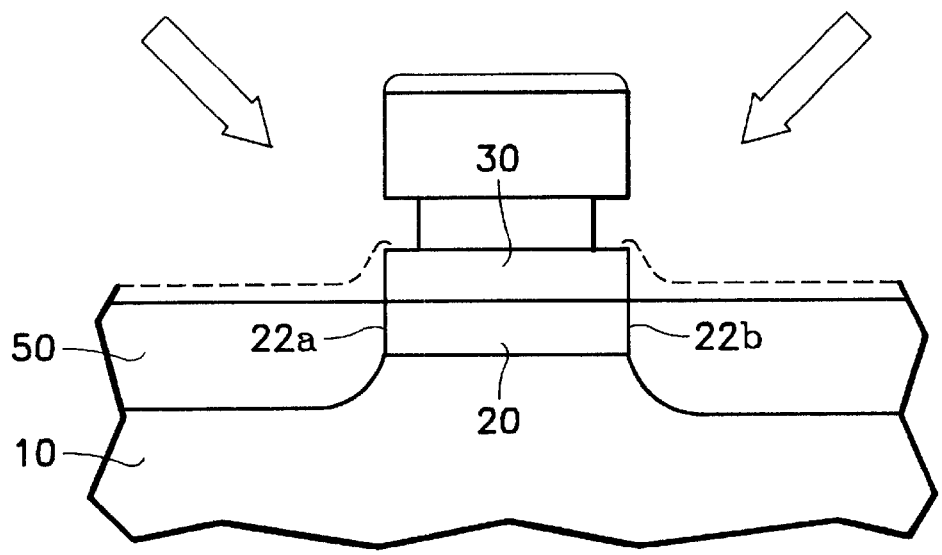
FIG. 9 shows a partially fabricated CIP thin film read head in accordance with a preferred embodiment of the present invention.

Turning to FIG. 9, in some embodiments it may be possible to deposit the bias layer 50 on the insulation layer 10. This depends upon factors such as the amount of insulation material 10 removed during magnetoresistive element 20 formation and the desired thickness of the bias layer 50 and any underlying structure.

Additional insulation, shield structures, and a thin film write head typically are formed over the leads and magnetoresistive element 20 as is known in the art.

Figure 10:
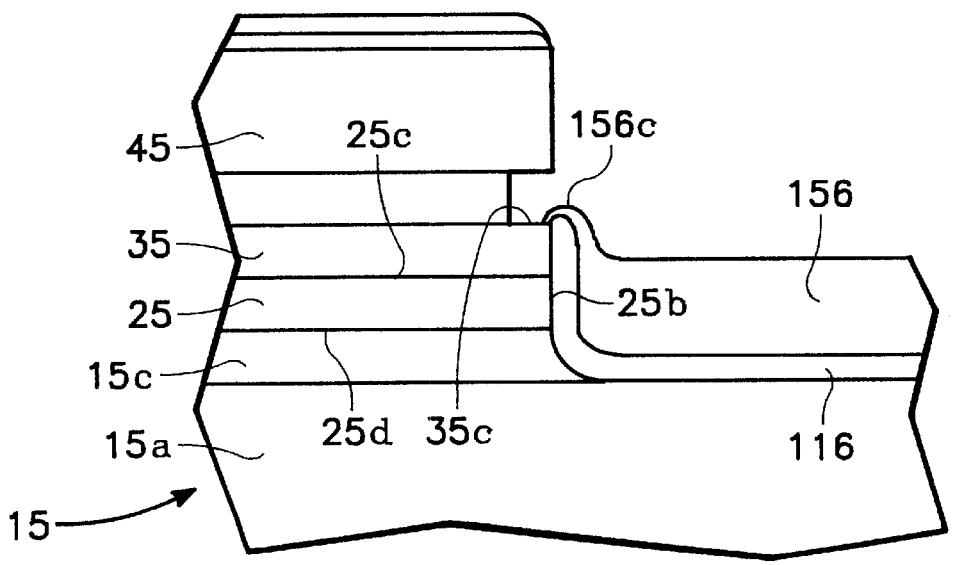
FIG. 10 shows a partially fabricated CPP thin film read head in accordance with a preferred embodiment of the present invention.
Figure 11:
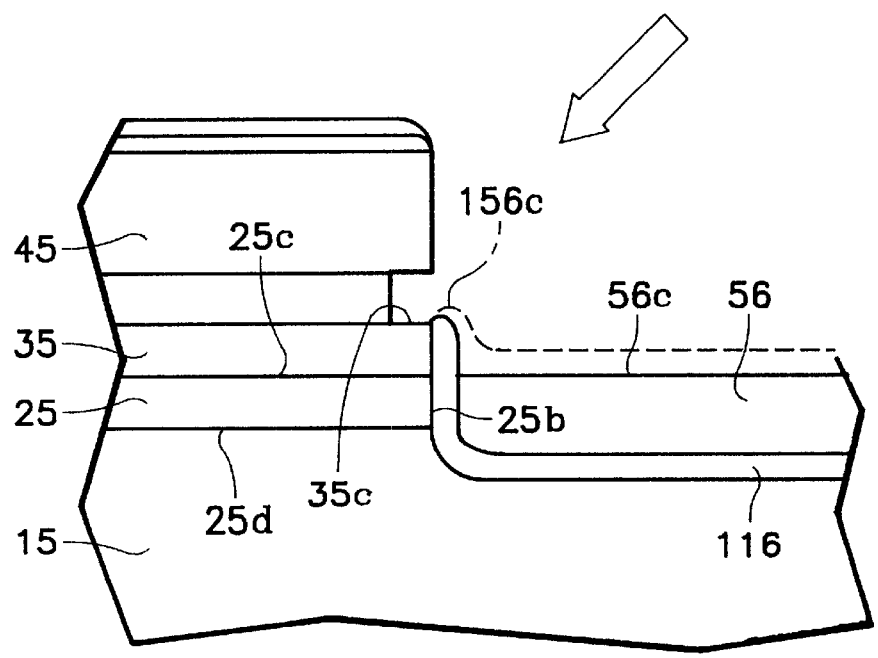
FIG. 11 shows a partially fabricated CPP thin film read head in accordance with a preferred embodiment of the present invention.
Figure 12:
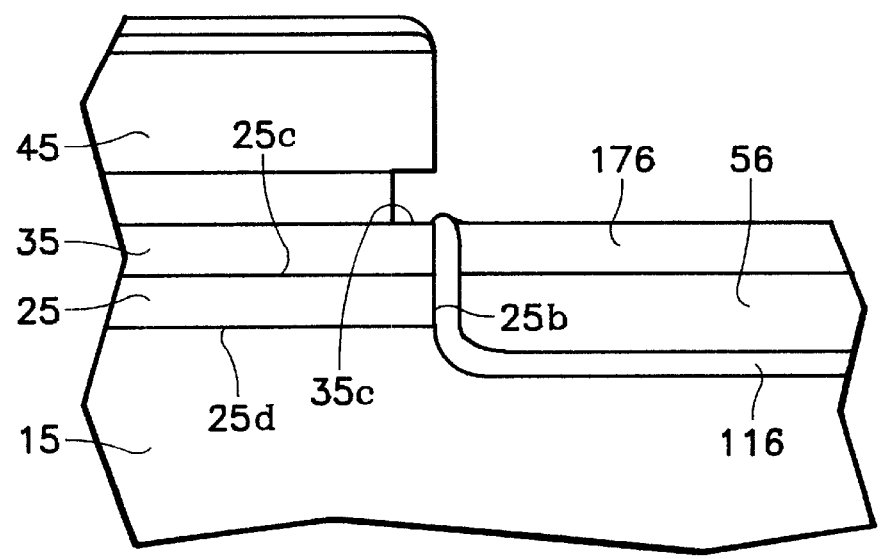
FIG. 12 shows a partially fabricated CPP thin film read head in accordance with a preferred embodiment of the present invention.

Current Perpendicular-to-the Plane Embodiments
(FIGS. 10–12)

FIGS. 10–12 show a cross-section perpendicular to the ABS of a partially fabricated CPP embodiment. In the CPP embodiment, the magnetoresistive element 25 is formed with a generally planar backwall 25b distal from an air bearing surface (not shown) by etching into the underlying base layer 15, as discussed above, to remove backwall taper. In CPP embodiments, the base layer 15 typically is formed of lead material 15c, shield material 15a, or both as shown in FIG. 10, and supplies sensing current across the magnetoresistive element 25 perpendicular to the plane of the layer or layers of the magnetoresistive element 25.

Providing a magnetoresistive element 25 without a tapered backwall allows for improved bias magnet profile with respect to the magnetoresistive element 25. It allows the bias magnet to be formed with generally vertical wall opposing the magnetoresistive element backwall. This improves the domain structure within the magnetoresistive element 25, particularly near the edge of the magnetoresistive element 25.

As discussed above, the protective element 35 is used to protect the underlying surface during formation of permanent magnet and other insulation structures, as will be discussed further below. It is presently preferred to form the protective element 35 of any typical inorganic insulative material, such as for example $Al_2O_3$, $SiO_2$, $SiN_x$, or the like. The preferred embodiments of the CPP may have any known sensor type, such as giant magnetoresistive multilayer, or any other known type.

In CPP embodiments, the filler layer 116 is formed of an insulative material, such as for example $Al_2O_3$, $SiO_2$, $SiN_x$, or the like, to provide insulation between the base layer 15 and the bias layer 156.

In addition, in CPP devices the filler layer 116 may also serve to insulate the magnetoresistive element 25 from bias material 156. As such, the filler layer 116 may be deposited so that it extends along a backwall 25e of the magnetoresistive element 25 distal from an air bearing surface(not shown). This prevents the bias layer 156 material from creating a shunt path around the magnetoresistive element 25.

The amount of the fill layer 116 deposited is dependent upon the amount of base material removed during magnetoresistive element 25 formation, upon the desired separation between bias material 156 and base layer 15, and upon the desired separation between the bias material 156 and the magnetoresistive element 25. Sputtering, physical vapor deposition or PVD, chemical vapor deposition or CVD, or ion beam deposition may be used to deposit the fill layer 116. The selection of the process will depend the cavity depth and on the desired ratio of sidewall to vertical deposition. It is presently preferred that the fill layer 116 be formed so that the bias layer 156 forms generally parallel to backwall 25b, and so that the bias layer 156 extends to about, or to slightly below, the level of the bottom surface 25d of the magnetoresistive element 25. In a typical application, on the order of about 1000 Angstroms to 4000 Angstroms of insulative filler material may be deposited using a chemical vapor deposition technique, or a physical sputtering technique such as RF DC magnetron sputttering, so that about 1000 Angstroms of insulation filler material 116 is deposited on the sidewalls 25a & 25b of the magnetoresistive element 25.

The bias layer 156 may be formed of a magnetic material, as discussed above. The bias layer 156, typically forms with a taper portion 156c that may overhang the backwall 25b of the magnetoresistive element 25. This taper portion 156c and its overhang can affect the direction and stability of the induced longitudinal field within the magnetoresistive element as discussed above.

As such, in the preferred embodiment and method of the present invention, the bias layer 156 is etched to remove the taper portion 156c and its overhang, as shown in FIG. 11. With the preferred method, directional etching is used to remove the overhanging portion and substantially all the remaining portion of the taper 156c. In the preferred method, an excess of bias material is deposited so that after etching to remove the taper 156c, the top surface 56c of the bias layer 56 extends slightly above, or is at the same level of the top surface 25c of the magnetoresistive element 25.

In the preferred method, the bias material 156 is etched so that the sidewall etch rate is maximized. The etching tilt angle and the rotational angle are adjusted to provide the desired results. Furthermore, in addition to static etching, continuous rotation etching, a combination of static and continuous rotation etching, or etching between a range of rotational angles may be employed to maximize removal of the taper portion 156c and its overhang. For example, a static etch process with tilt angles with respect to wafer normally ranging from 0–70 degrees, a rocking etch process with a rocking angle of 0 degrees static to +/−45 degrees about the axis normal to the wafer plane without substrate rotation, or continuous rotation using conventional substrate rotation with etch angles of 0–70 degrees with respect to wafer normal may be employed.

Turning to FIG. 12, in one embodiment, an additional insulation layer 176 may be deposited over on the etched bias layer 56, and the resist structure 45 removed, to allow for vias (not shown) to be formed through the protective element 35 for couple sensing current through the magnetoresistive CPP device. Or, as discussed above, the protective insulation element 35 may be removed prior to forming a lead to the sensor element. Additional insulation, shield structures, and a thin film write head may be formed over the leads and magnetoresistive element 20 as is known in the art.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A thin film read head comprising:

a) a magnetoresitive element; and b) a magnetic bias layer for biasing the magnetoresistive element with generally vertical sidewalls, the magnetic bias layer being initially formed with a taper portion that overhangs the magnetoresistive element, the magnetic bias layer having a top side at a level closer to a level of the taper portion of the bias layer than a level of a bottom side, the magnetoresistive element having a top side at a level closer to the level of the taper portion than a level of a bottom side and further from the level of the taper portion than the level of the top side of the magnetic bias layer, and the magnetic bias layer being Ether formed by removing the taper portion overhanging the magnetoresistive element so that the top side of the magnetic bias layer is at a level that is the level of the top side of the magnetoresistive element, wherein the bottom side of the magnetorsistive element is located closer to the plane containing the top side of the magnetoresistive element and the magnetic bias layer than the bottom side of the magnetic bias layer.

2. The thin film read head of claim 1 wherein the magnetoresistive element is formed by etching through a magnetoresistive layer into an underlying layer to form the magnetoresistive element.

3. The thin film read head of claim 2 further comprising vertical wall insulation interposed between vertical wall of the magnetoresistive element and the magnetic bias layer to form a current perpendicular-to-the plane sensor.

4. The thin film read head of claim 3 wherein the vertical wall insulation is also interposed between an underlying layer and the magnetic bias layer.

5. The thin film read head of claim 1, wherein the bias layer is separated from the magnetorsistive element by 1000 to 4000 angstroms.

6. The thin film read head of claim 1, wherein the bias layer is separated from the magnetoresistive element by 1000 angstrorns.

7. The thin film read head of claim 1, wherein the magnetic bias layer is thicker than the magnetoresistive element.

* * * * *